US006687391B1

United States Patent
Scott et al.

(10) Patent No.: US 6,687,391 B1
(45) Date of Patent: *Feb. 3, 2004

(54) ADJUSTABLE, ROTATABLE FINGER GUIDE IN A TENPRINT SCANNER WITH MOVABLE PRISM PLATEN

(75) Inventors: Walter Guy Scott, North Palm Beach, FL (US); Dean Fedele, Jupiter, FL (US); John F. Carver, Hobe Sound, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/461,344

(22) Filed: Dec. 15, 1999

Related U.S. Application Data

(63) Continuation-in-part of application No. 09/422,937, filed on Oct. 22, 1999, now abandoned.

(51) Int. Cl.[7] .................................................. G06K 9/00
(52) U.S. Cl. ...................................... 382/126; 382/127
(58) Field of Search .............................. 382/124, 126, 382/127, 115, 125; 340/5.52, 5.53, 5.82, 5.83, 146.3, 825.31; 118/31.5; 356/71; 376/15; 707/6, 9; 713/186, 200; 902/3, 6

(56) References Cited

U.S. PATENT DOCUMENTS

| 2,500,017 | A | 3/1950 | Altman | 88/57 |
| 3,200,701 | A | 8/1965 | White | 88/14 |

(List continued on next page.)

FOREIGN PATENT DOCUMENTS

| EP | 0 101 722 A1 | 3/1984 | G07C/9/00 |
| EP | 0 308 162 A2 | 3/1989 | A61B/5/10 |
| EP | 0 379 333 A1 | 7/1990 | G07F/7/10 |
| EP | 0 623 890 A2 | 11/1994 | G06K/9/38 |
| EP | 0 379 333 B1 | 7/1995 | G07F/7/10 |
| EP | 0 889 432 A2 | 1/1999 | G06K/9/00 |
| EP | 0 905 646 A1 | 3/1999 | G06K/11/18 |
| EP | 0 924 656 A2 | 6/1999 | G07C/9/00 |
| GB | 2 089 545 A | 6/1982 | G06K/9/20 |
| GB | 2 313 441 A | 11/1997 | G06K/7/10 |
| WO | WO 87/02491 | 4/1987 | G07C/9/00 |

(List continued on next page.)

OTHER PUBLICATIONS

Btt (Biometric Technology Today), Finger technologies contacts, 2 pages.

(List continued on next page.)

*Primary Examiner*—Amelia M. Au
*Assistant Examiner*—Brian Le
(74) *Attorney, Agent, or Firm*—Sterne, Kessler, Goldstein & Fox P.L.L.C.

(57) ABSTRACT

A scanning device for electronically capturing a fingerprint image, employing a finger guide unit and a platen. The finger guide unit positions a finger for scanning by means of a gap into which the finger is placed. The guide maintains the finger within the print scanning range when used in conjunction with a movable platen. The guide unit is rotatable allowing the guide to be moved to expose the whole movable platen. The finger guide unit has two guide plates disposed adjacent one another creating a gap. The gap width is adjustable by means of an adjustment device, allowing fingers of any size to be properly positioned and guided within the scanner reading range. The guide plates each have an edge lined with low-friction material which contacts the finger when in use. The guide plates each have an extension which serves as a handle for raising the guide unit and as a hanger for suspending the guide unit above the platen for use. The guide plates also have an alignment rod disposed between them to ensure stabilization and alignment.

20 Claims, 5 Drawing Sheets

U.S. PATENT DOCUMENTS

| | | | | |
|---|---|---|---|---|
| 3,482,498 A | | 12/1969 | Becker .......................... 95/12 |
| 3,527,535 A | | 9/1970 | Monroe ...................... 356/71 |
| 3,617,120 A | | 11/1971 | Roka ........................... 353/28 |
| 3,699,519 A | | 10/1972 | Campbell ............ 340/146.3 E |
| 3,824,951 A | * | 7/1974 | Le Vantine et al. ......... 118/31.5 |
| 3,947,128 A | | 3/1976 | Weinberger et al. .......... 356/71 |
| 3,968,476 A | | 7/1976 | McMahon ........... 340/146.3 E |
| 4,032,975 A | | 6/1977 | Malueg et al. ............... 358/213 |
| 4,063,226 A | | 12/1977 | Kozma et al. ............... 365/125 |
| 4,210,899 A | | 7/1980 | Swonger et al. ...... 340/146.3 E |
| 4,253,086 A | * | 2/1981 | Szwarcbier ............... 340/146.3 |
| 4,414,684 A | | 11/1983 | Blonder ......................... 382/4 |
| 4,537,484 A | | 8/1985 | Fowler et al. ................. 354/62 |
| 4,544,267 A | | 10/1985 | Schiller ....................... 356/71 |
| 4,601,195 A | | 7/1986 | Garritano ....................... 73/60 |
| 4,669,487 A | | 6/1987 | Frieling |
| 4,681,435 A | | 7/1987 | Kubota et al. ................. 356/71 |
| 4,783,823 A | | 11/1988 | Tasaki et al. ................... 382/4 |
| 4,784,484 A | | 11/1988 | Jensen .......................... 356/71 |
| 4,792,226 A | * | 12/1988 | Fishbine et al. ............... 356/71 |
| 4,811,414 A | | 3/1989 | Fishbine et al. ............... 382/52 |
| 4,876,726 A | | 10/1989 | Capello et al. ................. 382/4 |
| 4,905,293 A | * | 2/1990 | Asai et al. ...................... 382/4 |
| 4,924,085 A | | 5/1990 | Kato et al. ............. 250/227.28 |
| 4,933,976 A | | 6/1990 | Fishbine et al. ................ 382/4 |
| 4,942,482 A | | 7/1990 | Kakinuma et al. |
| 4,995,086 A | | 2/1991 | Lilley et al. .................... 382/4 |
| 5,054,090 A | | 10/1991 | Knight et al. ................... 382/4 |
| 5,067,162 A | | 11/1991 | Driscoll, Jr. et al. ............ 382/5 |
| 5,067,749 A | | 11/1991 | Land ........................... 283/117 |
| 5,131,038 A | | 7/1992 | Puhl et al. ..................... 380/23 |
| 5,146,102 A | | 9/1992 | Higuchi et al. ............. 250/556 |
| 5,185,673 A | | 2/1993 | Sobol |
| 5,187,747 A | | 2/1993 | Capello et al. ................. 382/4 |
| 5,222,152 A | | 6/1993 | Fishbine et al. ............... 382/2 |
| 5,230,025 A | | 7/1993 | Fishbine et al. ............... 382/4 |
| 5,233,404 A | | 8/1993 | Lougheed et al. ............ 356/71 |
| 5,249,370 A | | 10/1993 | Stanger et al. ................. 34/22 |
| 5,253,085 A | | 10/1993 | Maruo et al. |
| 5,291,318 A | | 3/1994 | Genovese |
| D348,445 S | | 7/1994 | Fishbine et al. ........... D14/107 |
| D351,144 S | | 10/1994 | Fishbine et al. ........... D14/107 |
| 5,363,318 A | | 11/1994 | McCauley |
| 5,384,621 A | | 1/1995 | Hatch et al. ................. 355/204 |
| 5,412,463 A | | 5/1995 | Sibbald et al. |
| 5,416,573 A | | 5/1995 | Sartor, Jr. ..................... 356/71 |
| 5,467,403 A | | 11/1995 | Fishbine et al. ............. 382/116 |
| 5,469,506 A | | 11/1995 | Berson et al. ................. 380/23 |
| 5,473,144 A | | 12/1995 | Mathurin, Jr. ............... 235/380 |
| 5,483,601 A | * | 1/1996 | Faulkner ...................... 382/115 |
| 5,509,083 A | | 4/1996 | Abtahi et al. ................ 382/124 |
| 5,517,528 A | | 5/1996 | Johnson ...................... 375/259 |
| 5,528,355 A | | 6/1996 | Maase et al. .................. 356/71 |
| 5,548,394 A | | 8/1996 | Giles et al. .................... 356/71 |
| 5,591,949 A | | 1/1997 | Bernstein .................... 235/380 |
| 5,596,454 A | | 1/1997 | Hebert ......................... 359/642 |
| 5,598,474 A | | 1/1997 | Johnson ........................ 380/23 |
| 5,613,014 A | | 3/1997 | Eshera et al. ................ 382/124 |
| 5,615,277 A | | 3/1997 | Hoffman ..................... 382/115 |
| 5,625,448 A | * | 4/1997 | Ranalli et al. ................ 356/71 |
| 5,640,422 A | | 6/1997 | Johnson ...................... 375/259 |
| 5,649,128 A | | 7/1997 | Hartley ........................ 395/309 |
| 5,650,842 A | | 7/1997 | Maase et al. .................. 356/71 |
| 5,661,451 A | | 8/1997 | Pollag ......................... 340/426 |
| 5,680,205 A | | 10/1997 | Borza .......................... 356/71 |
| 5,689,529 A | | 11/1997 | Johnson ...................... 375/259 |
| 5,717,777 A | | 2/1998 | Wong et al. ................. 383/124 |
| 5,745,684 A | | 4/1998 | Oskouy et al. .......... 395/200.8 |
| 5,748,766 A | | 5/1998 | Maase et al. ............... 382/124 |
| 5,748,768 A | | 5/1998 | Sivers et al. |
| 5,755,748 A | | 5/1998 | Borza .......................... 607/61 |
| 5,757,278 A | * | 5/1998 | Itsumi .................. 340/825.31 |
| 5,767,989 A | | 6/1998 | Sakaguchi |
| 5,778,089 A | | 7/1998 | Borza ......................... 382/124 |
| 5,781,647 A | | 7/1998 | Fishbine et al. ............... 382/1 |
| 5,793,218 A | | 8/1998 | Oster et al. .................. 324/754 |
| 5,805,777 A | | 9/1998 | Kuchta ....................... 395/112 |
| 5,809,172 A | | 9/1998 | Melen |
| 5,812,067 A | | 9/1998 | Bergholz et al. ....... 340/825.31 |
| 5,815,252 A | | 9/1998 | Price-Francis ............... 356/71 |
| 5,818,956 A | | 10/1998 | Tuli ............................. 382/126 |
| 5,822,445 A | | 10/1998 | Wong ......................... 382/127 |
| 5,825,005 A | | 10/1998 | Behnke ....................... 235/380 |
| 5,825,474 A | | 10/1998 | Maase ......................... 356/71 |
| 5,828,773 A | | 10/1998 | Setlak et al. ................ 382/126 |
| 5,832,244 A | | 11/1998 | Jolley et al. ................. 395/309 |
| 5,848,231 A | | 12/1998 | Teitelbaum et al. ......... 395/186 |
| 5,859,420 A | | 1/1999 | Borza ...................... 250/208.4 |
| 5,859,710 A | | 1/1999 | Hannah |
| 5,862,247 A | | 1/1999 | Fisun et al. ................. 382/116 |
| 5,867,802 A | | 2/1999 | Borza .......................... 701/35 |
| 5,869,822 A | | 2/1999 | Meadows, II et al. ...... 235/380 |
| 5,872,834 A | | 2/1999 | Teitelbaum ............. 379/93.03 |
| 5,900,993 A | | 5/1999 | Betensky .................... 359/710 |
| 5,907,627 A | | 5/1999 | Borza ......................... 382/124 |
| 5,920,384 A | | 7/1999 | Borza .......................... 356/71 |
| 5,920,640 A | | 7/1999 | Salatino et al. ............ 382/124 |
| 5,928,347 A | | 7/1999 | Jones ......................... 710/129 |
| 5,942,761 A | * | 8/1999 | Tuli ............................. 250/556 |
| 5,960,100 A | | 9/1999 | Hargrove ................... 382/124 |
| 5,973,731 A | | 10/1999 | Schwab ...................... 348/161 |
| 5,974,162 A | | 10/1999 | Metz et al. ................. 382/124 |
| 5,987,155 A | | 11/1999 | Dunn et al. ................. 382/116 |
| 5,991,467 A | | 11/1999 | Kamiko |
| 5,995,014 A | | 11/1999 | DiMaria ............... 340/825.31 |
| 6,018,739 A | | 1/2000 | McCoy et al. ............. 707/102 |
| 6,023,522 A | | 2/2000 | Draganoff et al. .......... 382/124 |
| 6,041,372 A | | 3/2000 | Hart et al. .................... 710/62 |
| 6,055,071 A | | 4/2000 | Kuwata et al. |
| 6,064,753 A | | 5/2000 | Bolle et al. |
| 6,064,779 A | | 5/2000 | Neukermans et al. |
| 6,072,891 A | | 6/2000 | Hamid et al. |
| 6,075,876 A | | 6/2000 | Draganoff ................... 382/124 |
| 6,078,265 A | | 6/2000 | Bonder et al. ......... 340/825.31 |
| 6,088,585 A | | 7/2000 | Schmitt et al. ............. 455/411 |
| 6,104,809 A | | 8/2000 | Berson et al. ................ 380/23 |
| 6,122,394 A | | 9/2000 | Neukermans et al. |
| 6,178,255 B1 | * | 1/2001 | Scott et al. .................. 382/124 |
| 6,195,447 B1 | | 2/2001 | Ross |
| 6,198,836 B1 | * | 3/2001 | Hauke ........................ 382/125 |
| 6,272,562 B1 | | 8/2001 | Scott et al. |
| 6,281,931 B1 | | 8/2001 | Tsao et al. |
| 6,327,047 B1 | | 12/2001 | Motamed |
| 6,347,163 B2 | | 2/2002 | Roustaei |

FOREIGN PATENT DOCUMENTS

| | | | |
|---|---|---|---|
| WO | WO 90/03620 | 4/1990 | ............ G06K/9/20 |
| WO | WO 92/11608 | 7/1992 | ............ G06K/9/00 |
| WO | WO 94/22371 | 10/1994 | ............ A61B/5/117 |
| WO | WO 96/17480 | 6/1996 | .......... H04N/13/93 |
| WO | WO 97/29477 | 8/1997 | ............ G09G/5/08 |
| WO | WO 97/41528 A1 | 11/1997 | ............ G06K/9/00 |
| WO | WO 98/09246 | 3/1998 | |
| WO | WO 98/12670 | 3/1998 | ............ G07C/9/00 |
| WO | WO 99/12123 | 3/1999 | ............ G06K/9/00 |
| WO | WO 99/26187 A1 | 5/1999 | ............ G06K/9/00 |
| WO | WO 99/40535 | 8/1999 | ............ G06K/9/00 |

OTHER PUBLICATIONS

Drake, M.D. et al., "Waveguide hologram fingerprint entry device," *Optical Engineering*, vol. 35, No. 9, Sep. 1996, pp. 2499–2505.
Roethenbaugh, G. (ed.), *Biometrics Explained*, 1998, ICSA, pp. 1–34.
*Automated Identification Systems* (visited May 20, 1999) <http://www.trw.com/idsystems/bldgaccess2.html>, 1 page, Copyright 1999.
*Ultra–Scan Corporation Home Page* (visited May 20, 1999) <http://www.ultra–scan.com/index.htm>, 3 pages. (discusses techology as early as 1996).
*Profile* (last updated Aug. 16, 1998) <http://www.dermalog.de/Britain/Profile/profile.htm>, 3 pages. (discusses technology as early as 1990).
*ID–Card System Technical Specifications* (last updated Jul. 18, 1998) <http://dermalog.de/Britain/Products/ID–Card/idcard2.htm>, 2 pages.
*Fujitsu Limited Products and Services* (updated Apr. 21, 1999) <http://www.fujitsu.co.jp/hypertext/Products/index–e.html>, 3 pages, Copyright 1995–1999.
*SonyDCam* (visited May 20, 1999) <http://www.microsoft.com/DDK/ddkdocs/Win2K/sonydcam.htm>, 3 pages, Copyright 1999.
*Verid Fingerprint Verification* (visited May 17, 1999) <http://www.tssi.co.uk/products/finger.html>, 2 pages.
*Startek's Fingerprint Verification Products: Fingerguard FG–40* (visited May 18, 1999) <http://www.startek.com.tw/product/fg40/fg40.html>, 3 pages.
*SAC Technologies Showcases Stand–Alone SAC–Remote(TM)* (visited May 18, 1999) <http://www.pathfinder.com/money/latest/press/PW/1998Mar25/1026.html>, 2 pages.
"Biometrics, The Future Is Now," *www.securitymagazine.com*, May 1999, pp. 25–26.
*Mytec Technologies Gateway*, (visited Apr. 27, 1999) <http://www.mytec.com/Products/gateway/>, 1 page.
*Mytec Technologies Gateway: Features & Benefits*, (visited Apr. 27, 1999) <http://www.mytec.com/Products/gateway/features.htm>, 1 page.
*Mytec Technologies Touchstone Pro*, (visited Apr. 27, 1999) <http://www.mytec.com/Products/Touchstone/>, 1 page.
*Mytec Technologies Touchstone Pro: Features*, (visited Apr. 27, 1999) <http://www.mytec.com/Products/Touchstone/features.htm>, 1 page.
*Electronic Timeclock Systems and Biometric Readers* (last updated Apr. 17, 1999) <http://www.lfs–hr–bene.com/tclocks.html>, 1 page.
*Fingerprint Time Clock* (visited May 17, 1999) <http://www.lfs–hr–bene.com/Biometrics/Fingerprintclock.html>, 6 pages.
*KC–901: The KSI fingerprint sensor* (visited May 17, 1999) <http://www.kinetic.bc.ca/kc–901.html>, 3 pages.
*INTELNET INC.* (visited May 20, 1999) <http://www.intelgate.com/index.html>, 1 page, Copyright 1996.
*Ver–i–Fus Fingerprint Access Control System* (visited May 20, 1999) <http://www.intelgate.com/verifus.htm>, 2 pages. (Ver–i–fus product released in 1995).
*Ver–i–fus® Configurations* (visited May 20, 1999) <http://www.intelgate.com/verconfig.htm>, 1 page. (Ver–i–fus product released in 1995).
*Ver–i–Fus® & Ver–i–Fus$^{mil®}$* (visited May 20, 1999) <http://www.intelgate.com/vif_data.htm>, 3 pages. (Verifus product released in 1995).

*Access Control System Configurations* (visited May 20, 1999) <http://www.intelgate.com/access.htm>, 2 pages. (Ver–i–fus product released in 1995).
*Company* (visited May 17, 1999) <http://www.instainfo.com.company.htm>, 2 pages.
*TouchLock™ II Fingerprint Identity Verification Terminal* (visited May 17, 1999) <http://www.indentix.com/TLock.htm>, 4 pages.
*Physical Security and Staff Tracking Solutions* (visited May 17, 1999) <http://www.indetnix.com/products/biosecurity.html>, 3 pages, Copyright 1996–1998.
*Veriprint2000 Fingerprint Verification Terminal For Use With Jantek Time & Attendance Software* (visited May 17, 1999) <http://www.hunterequipment.com/fingerprint.htm>, 2 pages.
*Veriprint Product Applications* (visited Apr. 27, 1999) <http://www.biometricid.com/uses.htm>, 1 page, Copyright 1999.
*BII Home Page* (visited Apr. 27, 1999) <http://www.biometricid.com/homepage.htm>, 1 page, Copyright 1999.
*Veriprint 2100 Stand–Alone Fingerprint Verification Terminal* (visited Apr. 27, 1999) <http://www.biometricid.com/veriprinted2100.htm>, 3 pages.
Randall, N., "A Serial Bus on Speed," *PC Magazine*, May 25, 1999, pp. 201–203.
*The DERMALOG Check–ID* (visited Nov. 12, 1999) <http://www.dermalog.de/ganzneu/products_check.html>, 1 page.
*Check–ID Specifications and Features* (visited Nov. 12, 1999) <http://www.dermalog.de/ganzneu/spec_check.html>, 1 page, Copyright 1999.
*Startek's Fingerprint Verification Products: FingerFile 1050* (visited Oct. 8, 1999) <http://www.startek.com.tw/product/ff1050/ff1050.html>, 3 pages.
*Time is Money !* (visited Jun. 5, 1998) <http://www.iaus.com/afim.htm>, 3 pages.
*LS 1 LiveScan Booking Workstation High Performance Finger & Palm Scanning System* (visited Jun. 4, 1998) <http://www.hbs–jena.com/ls1.htm>, 6 pages, Copyright 1998.
*Welcome to the Homepage of Heimann Biometric Sytems GMBH* (visited Jun. 4, 1998) <http://www.hbs–jena.com/>, 1 page, Copyright 1998.
*Heimann Biometric Systems Corporate Overview* (visited Jun. 4, 1998) <http://www.hbs–jena.com/company.htm>, 4 pages, Copyright 1998.
*Remote Access Positive IDentification—raPID* (visited Jun. 3, 1998) <http://www.nec.com...>, 2 pages, Copyright 1997.
*Morpho DigiScan Cellular* (visited Jun. 3, 1998) <http://www.morpho.com/products/law$_{13}$ enforcement/digiscan/cellular.htm>, 2 pages, Copyright 1998.
*A.F.I.S.* (last updated Apr. 4, 1998) <http://www.dermalog.de/afis.htm>, 2 pages.
*Morpho FlexScan Workstation* (visited Jun. 3, 1998) <http://www.morpho.com/products/law_enforcement/flexscan/>, 2 pages, Copyright 1998.
*True–ID®* The LiveScan with special "ability". . . , 2 pages.
*Printrak International: User List* (visited Jun. 3, 1998) <http://www.printrakinternational.com and links>, 10 pages, Copyright 1996.
*Live–Scan Products: Tenprinter® 1133S* (visited Apr. 23, 1999) <http://www.digitalbiometrics.com/Products/tenprinter.htm>, 4 pages. (Tenprinter 1133S released in 1996).

*TouchPrint ™ 600 Live–Scan System* (visited Apr. 23, 1999) <http://www.identix.com/products/livescan.htm>, 4 pages, Copyright 1996–1998.
Systems for Live–Scan Fingerprinting, Digital Biometrics, Inc., 8 pages, Copyright 1998.
DBI FingerPrinter CMS, Digital Biometrics, Inc., 5 pages. (CMS released in 1998).
Fingerscan V20, Identix Incorporated, 1 page, Copyright 1999.
Verid Fingerprint Reader, TSSI, 4 pages.
Response to Request for Information, Cross Match Technologies, Inc., 12 pages, Apr. 14, 1999.
*Startek's Fingerprint Verification Products* (visited Nov. 17, 1999) <http://www.startek.com.tw/product/index.html>, 1 page.
*Introduction to Startek's Fingerprint Verification Products* (visited Nov. 17, 1999) <http://www.startek.com.tw/product/index2.html>, 2 pages.
*Automatic Fingerprint Identification Systems* (visited Nov. 17, 1999) <http://www.sagem.com/en/produit4–en/empreinte–dig–en.htm>, 1 page.
*Digital Biometrics Corporate Information* (visited Nov. 17, 1999) <http://www.digitalbiometrics.com/Corporate_info/Corporate_info.htm>, 2 pages. (discusses technology as early as 1985).
*DBI Live–Scan Products: Digital Biometrics TENPRINTER* (visited Nov. 17, 1999) <http://www.digitalbiometrics.com/products/tenprinter.htm>, 4 pages. (Tenprinter released in 1996).
*DBI Live–Scan Products: NETWORKING OPTIONS* (visited Nov. 17, 1999) <http://www.digitalbiometrics.com/products/networking_options.htm>, 3 pages.
*DBI Live–Scan Products: Digital Biometrics FingerPrinter CMS* (visited Nov. 17, 1999) <http://www.digitalbiometrics.com/products/FingerPrinterCMS.htm>, 3 pages. (CMS released in 1998).
*DBI Live–Scan Products: Image Printer Stations* (visited Nov. 17, 1999) <http://www.digitalbiometrics.com/products/imageprinter.htm>, 2 pages.
*DBI Live–Scan Products: FC–21 Fingerprint Capture Station* (visited Nov. 17, 1999) <http://www.digitalbiometrics.com/products/Fingerprintcapture.htm>, 2 pages.
*Series 400 OEM Scanner* (visited Nov. 17, 1999) <http://www.ultra–scan.com/400.htm>, 3 pages. (Scanner released in 1996).
*USC Scanner Design* (visited Nov. 17, 1999) <http://www.ultra–scan.com/scanner.htm>, 4 pages. (Scanner released in 1996).
*Series 500/600 Scanners* (visited Nov. 17, 1999) <http://www.ultra–scan.com/500.htm>, 3 pages. (Scanner released in 1996).
*Series 700 ID Station* (visited Nov. 17, 1999) <http://www.ultra–scan.com/700.htm>, 3 pages. (Scanner released in 1998).
*Identix: The Corporation* (visited Nov. 17, 1999) <http://www.identix.com/corporate/home.htm>, 2 pages, Copyright 1996–1998.
*Biometric Imaging Products* (visited Nov. 17, 1999) <http://www.identix.com/products/bioimage.htm>, 1 page, Copyright 1996–1998.
*TouchPrint™ 600 Live–Scan System* (visited Nov. 17, 1999) <http://www.identix.com/products/livescan.htm>, 4 pages, Copyright 1996–1998.

*TouchPrint™ 600 Palm Scanner* (visited Nov. 17, 1999) <http://www.identix.com/products/palmscan.htm>, 3 pages, Copyright 1996–1998.
*TouchPrint™ 600 Card Scan System* (visited Nov. 17, 1999) <http://www.identix.com/products/cardscan.htm>, 3 pages, Copyright 1996–1998.
*DERMALOG KEY—The safest and easiest way of access control* (Last updated Jul. 18, 1998) <http://www.dermalog.de/Britain/Products/Key/key.htm>, 1 page.
*DERMALOG FINGER–ID Your small size solution for high security* (Last updated Jul. 18, 1998) <http://www.dermalog.de/Britain/Products/Finger/fingerid.htm>, 1 page.
*Mytec: Corporate* (visited Nov. 17, 1999) <http://www.mytec.com/corporate/>, 2 pages.
*Kinetic Sciences Inc. Fingerprint Biometrics Division* (visited Nov. 17, 1999) <http://www.kinetic.bc.ca/main–FP-B.html>, 1 page.
*Fingerprint Biometrics: Securing The Next Generation*, May 19, 1999, (visited Nov. 17, 1999) <http://www.secugen.com/pressrel.htm>, 2 pages.
*Secugen Unveils Fully Functional Fingerprint Recognition Solutions*, May 11, 1999, (visited Nov. 17, 1999) <http://www.secugen.com/pressrel.htm>, 3 pages.
*POLLEX Technology Ltd., The Expert in Fingerprint Identification—POLLog* (visited Nov. 17, 1999) <http://www.pollex.ch/english/products/pollog.htm>, 2 pages.
*Sony Fingerprint Identification Terminal* (visited Nov. 17, 1999). <http://www.iosoftware.com/biosols/sony/fiu/applications/fit100.htm>, 2 pages.
*Sony Fingerprint Identification Unit (FIU–700)* (visited Nov. 17, 1999) <http://www.iosoftware.com/biosols/sony/fiu70/index.htm>, 2 pages. (Unit available late 1999).
*Sony Fingerprint Identification Unit* (visited Nov. 17, 1999) <http://www.iosoftware.com/biosols/sony/fiu/index.htm>, 3 pages.
*Fujitsu Fingerprint Recognition Device (FPI–550)* (visited Nov. 17, 1999) <http://www.iosoftware.com/biosols/fujitsu/fpi550.htm>, 2 pages.
*Mitsubishi MyPass LP–1002* (visited Nov. 17, 1999) <http://www.iosoftware.com/biosols/mitsubishi/mypass.htm>, 2 pages.
*SecureTouch PV—A Personal Password Vault* (visited Nov. 17, 1999) <http://www.biometricaccess.com/securetouch_pv.htm>, 1 page.
*Digital Descriptor Systems, Inc.–Profile* (visited Nov. 17, 1999) <http://www.ddsi–cpc.com/pages/profile.html>, 3 pages.
*Press Release: Printrak International Announces New Portable Fingerprint ID Solution*, Dec. 10, 1996, (visited Nov. 17, 1999) <http://www.scott.net/˜dg/25.htm>, 3 pages.
*Corporate Profile* (visited Nov. 17, 1999) <http://www.printrakinternational.com/corporate.htm>, 1 page.
*Printrak Products* (visited Nov. 17, 1999) <http://www.printrakinternational.com/Products.htm>, 1 page. (Discusses technology as early as 1974).
Verifier™ 200 Fingerprint Capture Devices, Cross Match Technologies, Inc., 2 pages, 1996–1997.
Verifier 200 Direct Fingerprint Reader, Cross Check Corporation, 2 pages, 1996–1997.
Verifier ™ 250 Fingerprint Capture Devices, Cross Match Technologies, Inc., 2 pages, 1996–1997.
Verifier 250 Small Footprint Direct Fingerprint Reader, Cross Check Corporation, 2 pages, 1996–1997.

Verifier ™290 Fingerprint Capture Devices, Cross Match Technologies, Inc., 2 pages, 1996–1997.

Verifier 290 Direct Rolled Fingerprint Reader, Cross Check Corporation, 2 pages, 1996–1997.

Verifier ™ 500 Fingerprint Capture Devices, Cross Match Technologies, Inc., 2 pages, 1998.

Biometric terminal, 1 page.

10–Print Imaging System, Cross Check Corporation, 2 pages, 1998.

*Cross Match Technologies, Inc.* (visited Mar. 25, 1999) <http://www.crossmatch.net/>, 1 page.

*Cross Match Technologies, Inc.—Products Overview* (visited Mar. 25, 1999) <http://www.crossmatch.net/new/products/product-index.html>, 1 page.

*Cross Match Technologies, Inc.—Law Enforcement Systems* (visited Mar. 25, 1999) <http://www.crossmatch.net/new/law/law-index.html>, 2 pages.

*Cross Match Technologies, Inc.—Commercial Systems: Building On The Standard* (visited Mar. 25, 1999) <http://www.crossmatch.net/new/commercial/commercial-index.html>, 2 pages.

*Cross Match Technologies, Inc.—International Sales* (visited Mar. 25, 1999) <http://www.crossmatch.net/new/sales/sales-index.html>, 1 page.

*Cross Match Technologies, Inc.—Support* (visited Mar. 25, 1999) <http://www.crossmatch.net/new/support/support-index.html>, 1 page.

*Cross Match Technologies, Inc.—News—Press Releases—Verifier 400 Press Release* (visited Mar. 25, 1999) <http://www.crossmatch.net/new/news/news-pr-050798.html>, 1 page.

*Global Security Fingerscan™ System Overview* (visited Jan. 11, 2003) <http://wwwu-net.com/mbp/sol/g/a9.thm>, 12 pages.

"Command Structure for a Low–Cost (Primitive) Film Scanner," *IBM Technical Disclosure Bulletin*, IBM Corp., vol. 35, No. 7, Dec. 1992, pp. 113–121.

*Fingerprint Scan API Toolkit Version 1.x Feature List* (Apr. 26, 2000) <http://www.mentalix.com/api/archive_fapiv-1.htm>, 3 pages.

"Image Acquisition System," *IBM Technical Disclosure Bulletin*, IBM Corp., vol. 29, No. 5, Oct. 1986, pp. 1928–1931.

Kunzman, Adam J. and Wetzel, Alan T., "1394 High Performance Serial Bus: The Digital Interface for ATV," *IEEE Transaction on Consumer Electronics*, IEEE, vol. 41, No. 3, Aug. 1995, pp. 893–900.

EPO Patent Abstract for Japanese Patent Publication No. 10–079017, published Mar. 24, 1998, 1 page.

EPO Patent Abstract for Japanese Patent Publication No. 10–262071, published Sep. 29, 1998, 1 page.

EPO Patent Abstract for Japanese Patent Publication No. 11–167630, published Jun. 22, 1999, 1 page.

EPO Patent Abstract for Japanese Patent Publication No. 11–252489, published Sep. 17, 1999, 1 page.

*Mentalix Provides The First IAFIS–Certified Latent Print Scanning Solution For Windows* (Jul. 23, 1999) <http://www.mentalix.com/pressreleases/fprintlook3_prel-.htm>, 2 pages.

Sluijs, F. et al., "An On–chip USB–powered Three–Phase Up/down DC/DC Converter in a Standard 3.3V CMOS Process," *2000 IEEE International Solid–State Circuits Conference*, IEEE, Feb. 9, 2000, pp. 440–441.

Venot, A. et al., "Automated Comparison of Scintigraphic Images," *Journal of Nuclear Medicine*, vol. 27, No. 8, Aug. 1986, pp. 1337–1342.

EPO Patent Abstract for Japanese Patent Publication No. 59–103474, published Jun. 14, 1984, 1 page.

\* cited by examiner

ADJUSTABLE, ROTATABLE FINGER GUIDE IN A TENPRINT SCANNER WITH MOVABLE PRISM PLATEN

This is a continuation-in-part of U.S. application Ser. No. 09/422,937, filed Oct. 22, 1999, abandoned.

BACKGROUND OF THE INVENTION

1. Field of the Invention

The present invention relates to the field of fingerprinting.

2. Related Art

Fingerprinting is a common method of distinguishing an individual. No two people have identical fingerprints on all ten fingers. Fingerprinting is used for identification in many commercial and legal settings. Law enforcement officials have often used fingerprinting for identification purposes. Conventional techniques for obtaining fingerprint images include application of ink to a person's fingertips and rolling or pressing the tips onto a recording card. This method has severe limitations. For instance, the ink can be extremely messy, and easily smear or blur, often requiring many attempts before a usable print is obtained. Further, it is difficult to adapt ink prints for computerized storage and retrieval, thus making it difficult for various governmental agencies to reliably transfer and share data.

To address this problem, fingerprint scanners have been developed to capture fingerprint images in digital data form, allowing an image to be saved in a database and allowing the saved image to be easily accessed and retrieved. Fingerprint Examiners and/or Automated Fingerprint Identification Systems can then use the digital images for identification of individuals. However, use of a scanner to capture the print still holds drawbacks. Current scanners require trained personnel to guide the fingers over the optical reading area while maintaining an accurate position and rate of rotation. If the fingers are not rotated at a proper rate, or their position is inaccurate, then data is lost, requiring the procedure to be conducted again. The problem is compounded when the person being fingerprinted is uncooperative, as is sometimes the case in law enforcement. Such methods require training and practice and can be both time consuming and tedious.

SUMMARY OF THE INVENTION

Movable platens allow the finger axis to be fairly stationary, while the finger rotates. This reduces the difficulty of rotating a finger at a specific, correct speed, but still requires proper positioning of the finger. The finger must be held in-line with the stationary scanning optics, as current scanners input only a narrow slice of data at a time. Therefore, there is a need for a finger guide, to provide a positioning framework for a finger. The finger guide of the present invention fills this need by providing a positioning reference, preferably used in conjunction with a movable platen. The guide assists when taking roll fingerprints, and may be moved out of the way when taking impressions or flat prints.

The present invention is a scanning device for electronically capturing a fingerprint image, employing a finger guide unit and a platen. The guide unit positions a finger for scanning. A finger is placed in a gap in the guide. The guide maintains the finger within a print scanning range when used in conjunction with a movable platen. This increases the likelihood of capturing a clear, well-defined print in the scanning process. This, in turn, increases efficiency.

The guide unit is rotatable allowing the whole unit to be moved to expose the movable platen. This allows the operator to access the whole platen when desirable, such as when an officer would need to capture a four-finger plain impression or to clean the platen. The guide rotates about a pivot shaft 180 degrees to a resting position. When desired, the guide may be rotated back into position above the platen to aid in further roll fingerprinting.

The finger guide unit of the preferred embodiment has two guide plates disposed adjacent one another creating a gap in which a finger can be placed for scanning. The gap width is adjustable by means of an adjustment device, allowing fingers of any size to be properly positioned and guided within the scanner reading range. The adjustment device changes the gap width by means of an adjustment wheel and threaded screws disposed in threaded apertures in the guide plates. When the adjustment wheel is turned, the screws rotate and move both guide plates equally and simultaneously in opposite directions, allowing the gap centerline to remain undisturbed. The adjustment wheel is held between the guide plates by means of an adjustment mount. The pivot shaft and threaded screws likewise pass through this adjustment mount. The guide plates each have an edge lined with low-friction material which contacts the finger when in use. This allows the finger to be smoothly rotated within the guide, allowing for easy and simple print capturing.

The finger guide plates each have an extension which serves as a handle for raising the guide unit and as a hanger for suspending the guide unit above the platen for use. The guide plates also have an alignment rod disposed between them to ensure stabilization and alignment.

Further embodiments, features and advantages of the present invention, as well as the structure and operation of the various embodiments of the present invention, are described in detail with reference to the accompanying drawings.

DETAILED DESCRIPTION OF THE PREFERRED EMBODIMENTS

The present invention relates to the field of fingerprinting for security control, and in particular., to assist in simplifying the acquisition of fingerprint images using a digital communication interface. The present invention specifically serves to increase efficiency, repeatability, and readability of fingerprint images.

The preferred embodiment of the present invention is now described with reference to the figures where like reference numbers indicate identical or functionally similar elements. While the invention is described in terms of a specific embodiment, it should be understood that this is done for illustrative purposes only. A person skilled in the relevant art will recognize that various modifications, rearrangements and substitutions can be made without departing from the spirit of the invention.

To more clearly delineate the present invention, an effort is made throughout the specification to adhere to the following term definitions consistently.

The term "finger" refers to any digit on a hand including, but not limited to, a thumb, an index finger, middle finger, ring finger, or a pinky finger.

The term "fingerprint scanner" is any type of scanner which can obtain an image of all or part of one or more fingers in a live scan including, but not limited to, a tenprint scanner. A "tenprint scanner" is a scanner that can capture images representative of ten fingers of a person. The captured images can be combined in any format including, but not limited to, an FBI tenprint format.

The term "platen" refers to a component that include an imaging surface upon which at least one finger is placed during a live scan. A platen can include, but is not limited to, an optical prism, set of prisms, or set of micro-prisms.

Figure 1A:
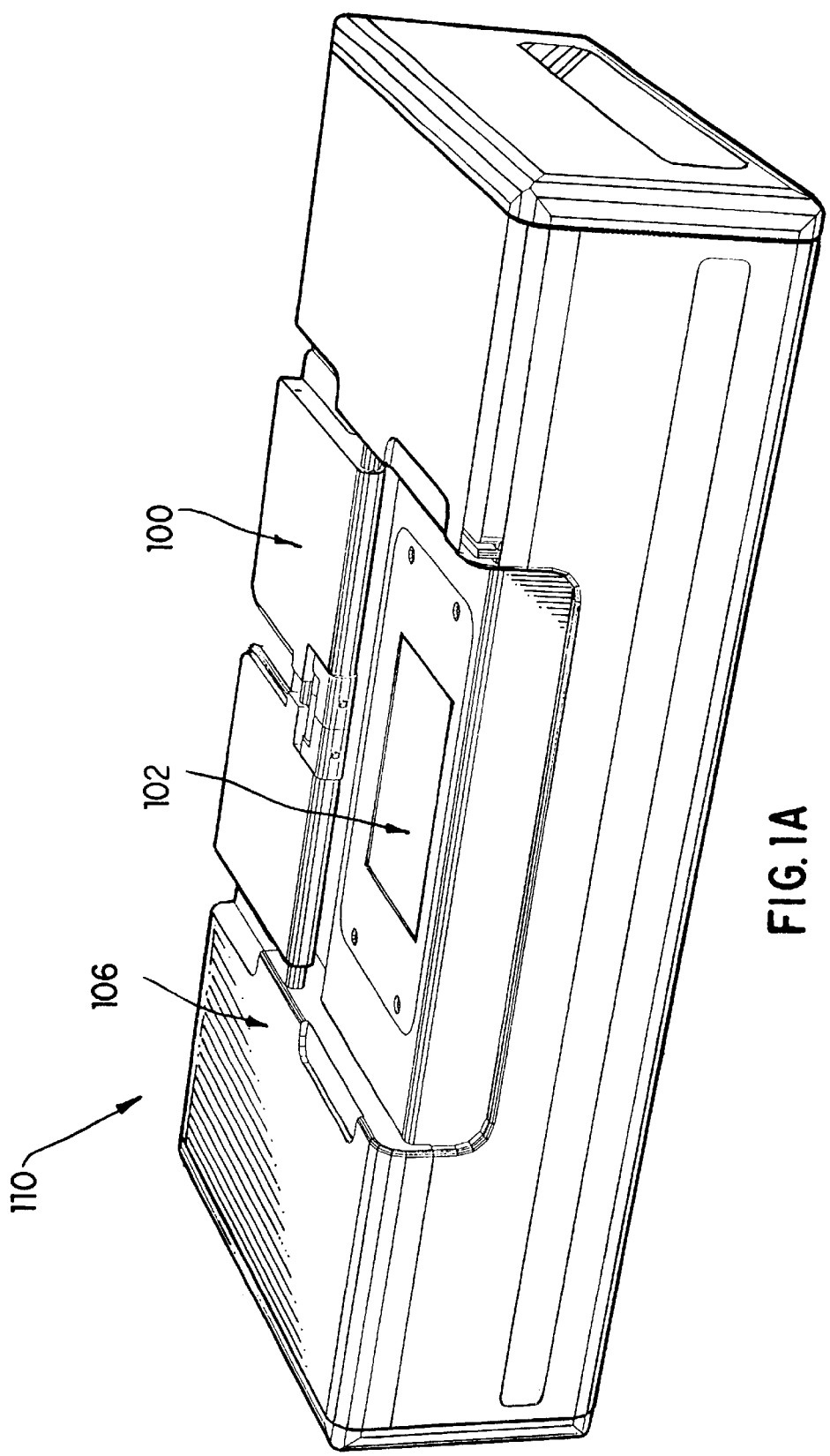
FIG. 1A is a view of a tenprint scanner with the finger guide unit in a "slap" position rotated off of the platen.

FIG. 1A shows the finger guide unit 100 of the present invention in conjunction with a tenprint scanner 110. Finger guide unit 100 is in the "slap" position, rotated to expose a platen 102. Tenprint scanner 110 includes a housing 106 enclosing scanning optics which capture a fingerprint image through platen 102. Platen 102 is slidably movable in the direction of the major axis of the tenprint scanner 110. Platen 102 slidably moves, yet the detector is maintained in a stationary position within scanner housing 106. In one example, platen 102 is preferably one face of a prism. This prism is located in an optical path to reflect light from a fingerprint resting on the face to the scanning detector. See, for example, commonly owned co-pending application 09/067,792, Individualized Fingerprint Scanner (1823.0020000), now U.S. Pat. No. 6,178,255 (which is incorporated herein by reference). In another example, platen 102 can also include a plurality of parallel prisms. See, e.g., U.S. Pat. No. 5,920,384 issued to Borza (incorporated herein by reference in its entirety).

Figure 1B:
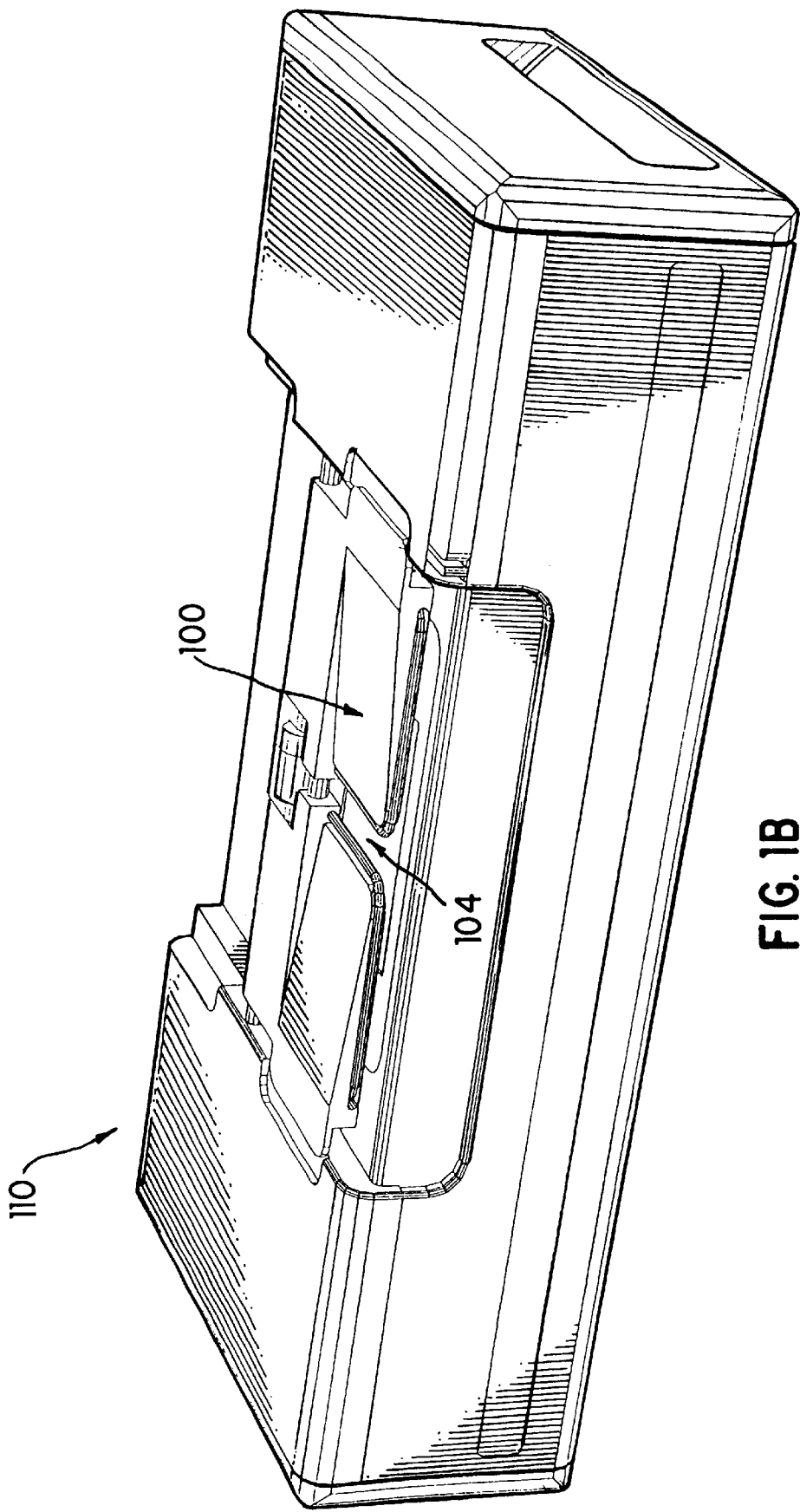
FIG. 1B is a view of a tenprint scanner with the finger guide unit in a "finger roll" position.

FIG. 1B shows the tenprint scanner of FIG. 1A with finger guide unit 100 in a "finger roll" position. A portion of platen 102 is exposed through a gap 104. When scanning a fingerprint, platen 102 slidably moves below finger guide unit 100, which is held fixed and stable. Finger guide 100 serves to keep the finger being scanned properly aligned with the scanning optics. For a proper roll print, a finger is placed in gap 104 onto platen 102. The finger is rotated from fingernail to fingernail so that the whole print has contacted platen 102 during the roll. The scanning optics capture only a portion of the finger's image at a time, so it is important that the finger stay within the scanning area as the finger rotates. The finger rotates around its axis, with the axis remaining substantially stationary, with the finger properly positioned by finger guide 100.

Figure 5:
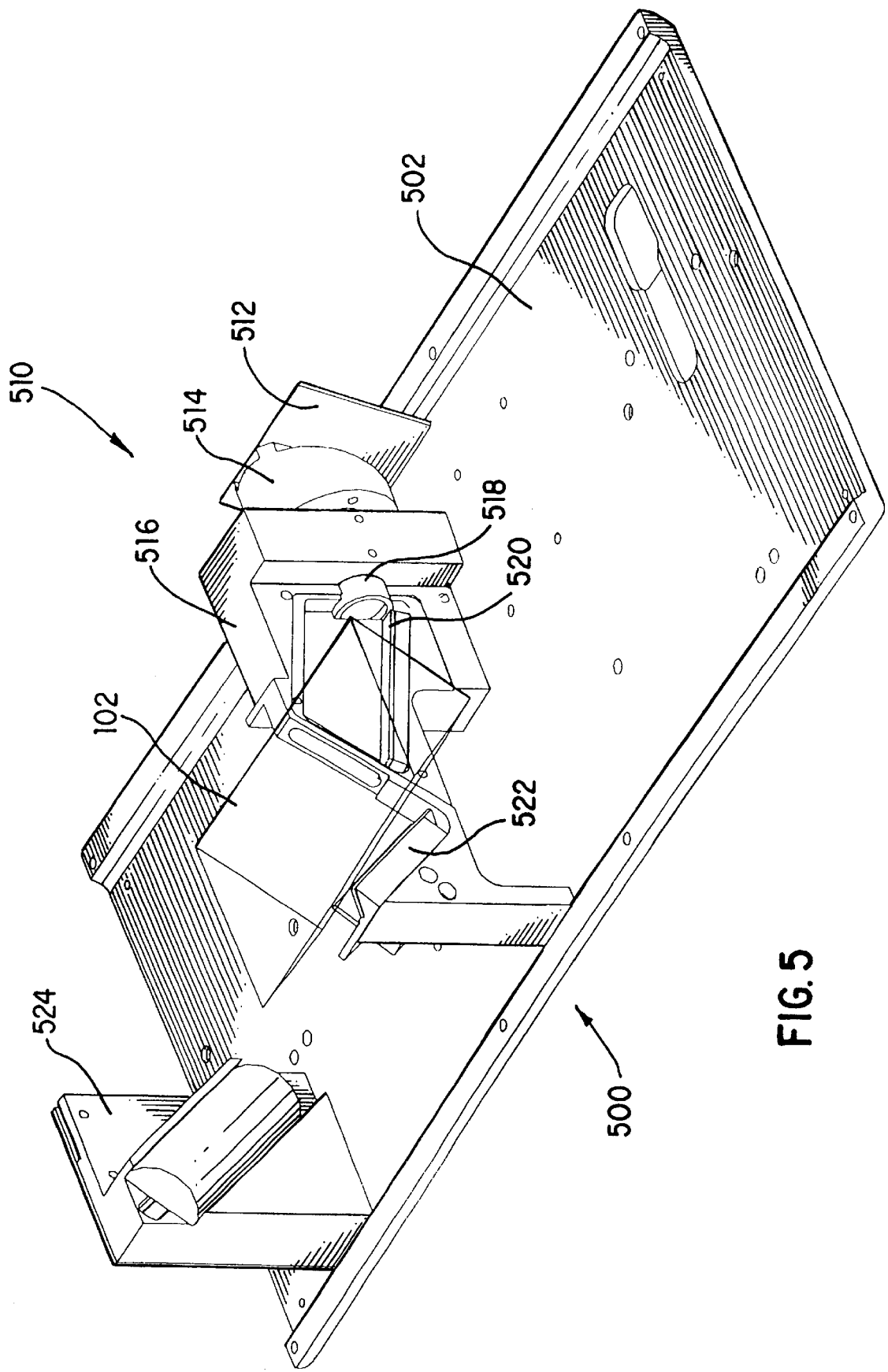
FIG. 5 is a view of the optical assembly without the housing shown in FIG. 1.

FIG. 5 shows the preferred embodiment of the housing interior 500 of the tenprint scanner of FIGS. 1A and 1B. Top housing 106 is removed revealing the optical assembly 510 fixedly attached to the housing bottom 502. Optical assembly 510 is comprised of a linear camera 512, a camera focus mount 514, an imaging optics housing 516, an imaging lens 518, a mirror 520, an illumination fold assembly 522, and an LED illuminator assembly 524. A floating image of movable platen 102 is also shown as an element of optical assembly 510. To capture a fingerprint image, a finger is placed in the scanning area on platen 102. LED illuminator assembly 524 serves as a light source and is comprised of cylinder lenses and an array of computer controlled LEDs. The beam of light from illuminator assembly 524 is reflected through an additional cylinder lens and mirror, which comprise illumination fold assembly 522. From illumination fold assembly 522 light refracts through a wedge face on platen 102, reflects off the finger on the top surface of platen 102 to be again refracted to mirror 520. The light image is reflected into imaging lens 518 fixedly secured in image optics housing 516. The light image passes through camera focus mount 514 to be captured by linear camera 512.

As shown, finger guide unit 100 is rotatably removable, exposing the whole platen. Proper finger-printing requires not only rolled prints be taken, but also that plain impression or "slaps" be taken to verify finger sequence. This is a print of all four fingers of each hand and the two thumbs. In order to properly take an impression print, the fingers are placed on the platen, and the movable platen is slid, along with the fingers, so that all fingers pass through the stationary scanning area. The image of the four fingers of each hand are captured in sequence and matched against the rolled prints. To accomplish this, finger guide unit 100 is rotated to the slap position as shown in FIG. 1A. The means of rotatable attachment is described in reference to FIG. 2 below.

Figure 2:
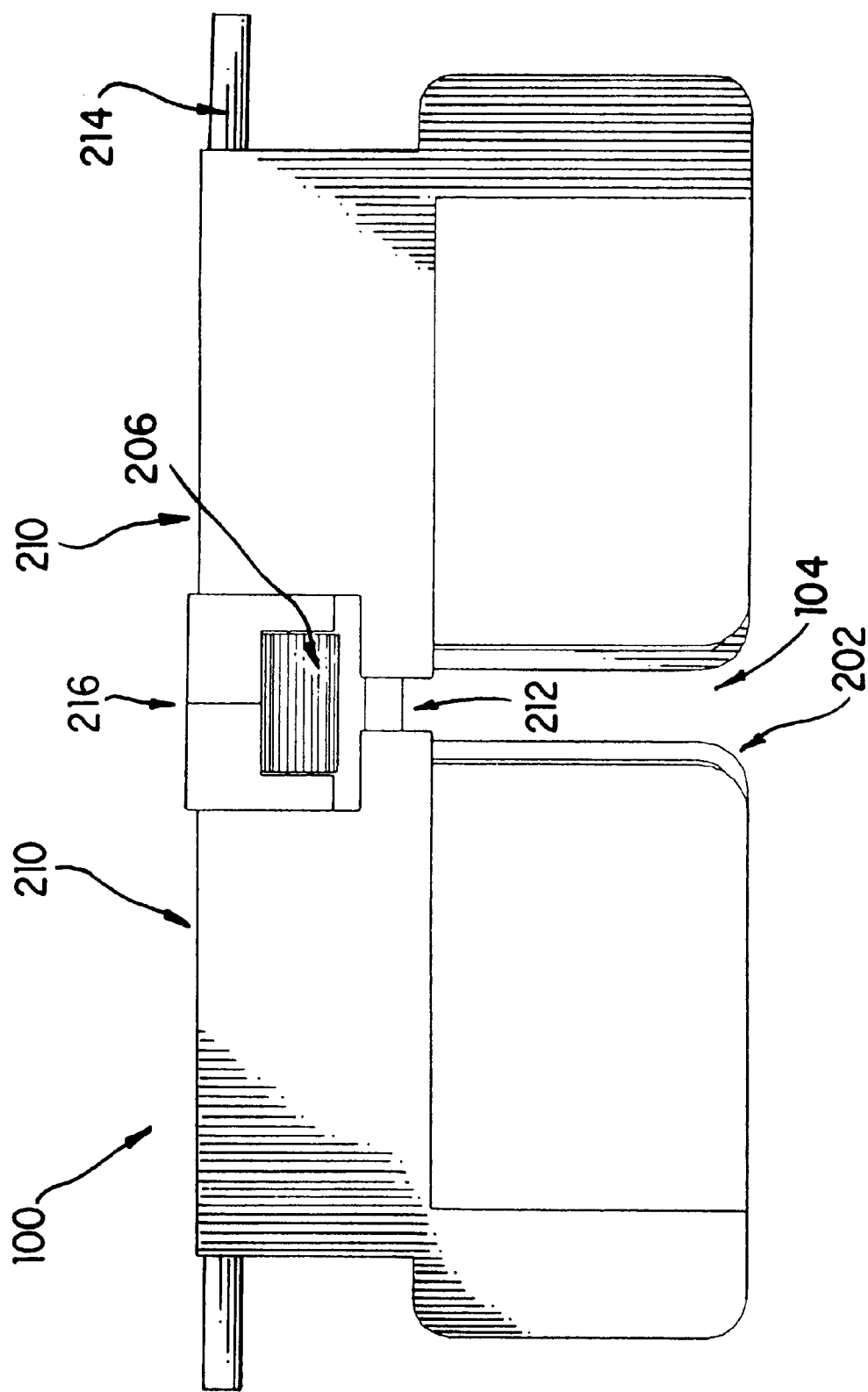
FIG. 2 is a top view of the finger guide unit.
Figure 3:
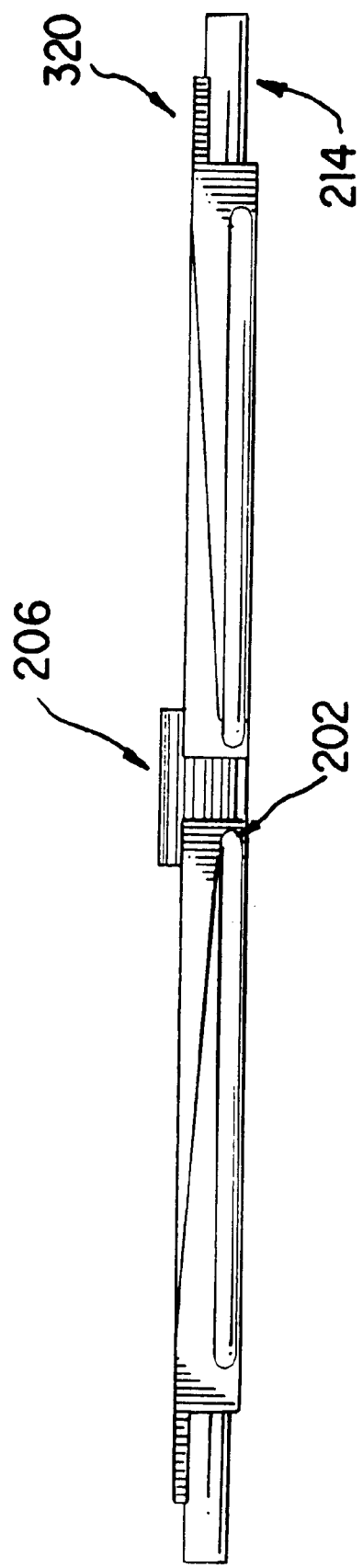
FIG. 3 is a front view of the finger guide unit.

FIG. 2 shows a top view of finger guide unit 100. Finger guide unit 100 is rotatably attached to pivot shaft 214. Pivot shaft 214 passes out each side of an adjustment mount 216, through a smooth bore in guide plates 210, and into scanner housing. The bore has a slightly larger diameter than pivot shaft 214, allowing guide plates 210 to move smoothly along pivot shaft 214 both slidably and rotatably. To expose the platen, guide unit 100 may be rotated 180 degrees from a finger roll position to a slap position. Pivot shaft 214 may be in any number of convenient pieces, whose ends may pass through adjustment mount 216 or alternatively, may be enclosed or embedded in adjustment mount 216. In the preferred embodiment, adjustment mount 216 is fixedly located on pivot shaft 214, forcing guide unit 100 to maintain its position on pivot shaft 214 and keeping the unit aligned with the scanner optics. Further, adjustment mount 216 may be made of one or more pieces. In the preferred emobodiment, adjustment mount 216 is comprised of two half pieces. This is done for ease of assembly.

The preferred embodiment of finger guide unit 100 is comprised of two guide plates 210, each having a contact edge 202 which serves to position a finger in the proper location for print scanning. Guide plates 210 are mirrored pieces, having a right plate and a left plate disposed adjacent one another and spread apart to create gap 104. In the finger roll position, finger guide unit 100 remains in a stable position, with the centerline of gap 104 aligned with the scanning device optics.

Finger guide unit 100 assists in properly placing the finger for simple, easier scanning. A finger placed in gap 104 may be rotated, yet, because of the stationary finger guide, will not axially change position. The finger will be in contact with the moveable platen, which will glide with the equivalent rotational velocity of the finger. This allows the print scanner to capture all sides of the print though the finger maintains its axial position.

Figure 4:
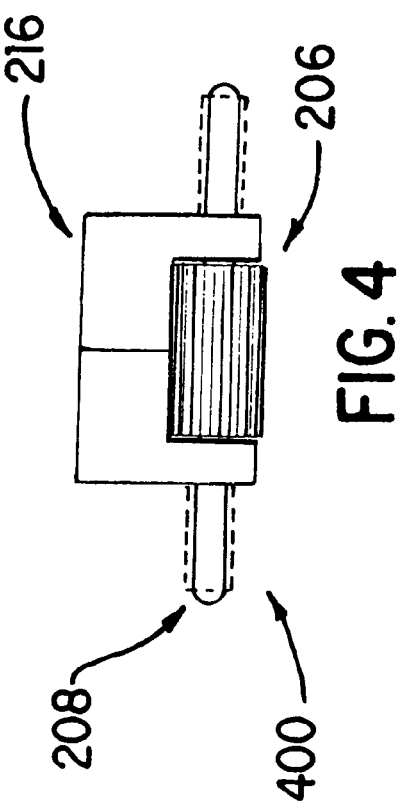
FIG. 4 is an isolated view of the adjustment device.

The width of gap 104 is adjustable by means of an adjustment device 400 (shown in FIG. 4) comprised of an adjustment wheel 206, adjustment mount 216, and threaded screws 208 threaded into apertures in guide plates 210. Adjustment wheel 206 is a knurled cylinder fixedly coupled with threaded screws 208. In the preferred embodiment, adjustment wheel 206 and threaded screws 208 are simultaneously manufactured from the same piece of material, resulting in a single component comprised of adjustment wheel 206 and threaded screws 208 each threaded in opposite directions. Threaded screws 208 are rotatably inserted into threaded bores in guide plates 210. Because threaded screws 208 are threaded in opposite directions, turning adjustment wheel 206 moves the guide plates in opposite directions to lessen or increase the width of gap 104. By turning adjustment wheel 206, the guide plates are moved linearly toward or away from the center of gap 104 (in other words, the gap centerline). Because the detector inside the housing images the gap centerline area, it is important that the gap centerline remain constant to keep the finger aligned. However, as previously explained, the moveable platen 102 allows a print to be scanned as the finger is rotated in conjunction with the moveable platen. Adjustment wheel 206 allows simple versatile use of the guide by accommodating fingers having different diameters. Adjustment mount 216 snugly holds adjustment wheel 206 in relation to pivot shaft 214. When adjustment mount 216 is properly secured to pivot shaft 214, guide unit 100 cannot slide along threaded screws or along pivot shaft 214. In the preferred embodiment, adjustment mount 216 is fixedly secured to pivot shaft 214 by means of set screws, tightened in adjustment mount 216 against pivot shaft 214. This ensures that the centerline of gap 104 and the scanning area of the optics within housing 102 are properly aligned for clear fingerprint capturing.

Because the unit is a guide, and not a clamp, it is desirable to have a unit that allows the finger to be easily and smoothly rotated. Therefore, finger contact edge 202 is located low on the inner edge of each guide plate 210. Contact edges 202 keep the finger in location during rotation. Contact edges 202 are manufactured of, or coated with a low friction material, such as polytetrafluoroethylene or daflon, to assist in keeping the finger centered in gap 104. A guide without a low friction material could be problematic in that as the finger is rotating, the finger would bind with contact edge 202, causing the resulting print to be skewed or stretched. Further, such binding may cause the finger to move away from guide unit centerline, requiring the print to be scanned again. The low friction material creates a slick surface for the finger to contact with low friction during rotation. It further eliminates excessive skin contact with the metal edge of guide plate 210 keeping the edge clean.

Contact edge 202 of the preferred embodiment may be removed from the guide plate, and has a replaceable low friction coating. This allows for easy replacement of the low friction coating should it become worn or dirty. Further, contact edge 202 of the preferred embodiment is a rod of stainless steel disposed along the edge of gap 104, bending around guide plate corner, and running substantially the length of the front edge of each guide plate 210. The low friction coating may cover the length of contact edge 202 or only the portion of contact edge 202 corresponding to gap 104.

In one example, a removable sleeve is placed on the rod along the length at gap 104. The sleeve is made of a low frictional material, such as, polytetrafluoroethylene or deflon. Contact edge 202 is secured to guide plate 210 by means of a single set screw, tightened in place. This screw can be removed to allow the rod to be freed at one end to allow the sleeve to be removed. In this way, sleeves can be replaced at appropriate times to maintain a level of cleanliness and hygiene.

Guide unit 100 is further provided with an alignment rod 212 which is disposed between guide plates 210 and is substantially parallel to pivot shaft 214. Alignment rod 212 is a smooth rod inserted into a smooth bore in each of left and right guide plates 210. This enables guide plates 210 to be adjusted by means of adjustment wheel 206 without introducing bending stress on pivot shaft 214, thus eliminating the chance of binding.

Guide unit 100 is also provided with an extension 320 to support guide plates 210 when in its usable position, rotated down onto the platen. Extension 320 rests on the scanner body, holding guide unit 100 about 0.030 to 0.040 inch above platen 102, permitting platen 102 to freely slide without additional frictional force. Extension 320 holds finger contact edge 202 at an optimal height above platen to provide guidance when taking a print. The guide however, could function substantially similar without the extension, relying on the low friction surfaces of the finger contact edge to rest directly on the platen. The extension further serves as a handle to ease the rotation of guide unit 100 to its slap or finger roll position.

What is claimed is:

1. A device for electronically capturing a fingerprint image comprising:

an optical platen having a scanning area; and a finger guide unit disposed above said platen and having a gap formed therein for receiving a finger, wherein said optical platen moves relative to said finger guide unit in response to rotation of the finger in said gap.

2. The device as set forth in claim 1 wherein said finger guide unit is rotatably connected to the device to rotate between a finger roll position and a slap position.

3. The device as set forth in claim 1 wherein said finger guide unit is rotatably connected to a pivot shaft.

4. The device as set forth in claim 3 wherein said finger guide unit is rotatable 180 degrees around said pivot shaft to expose said platen.

5. The device as set forth in claim 2 wherein said finger guide unit includes a left guide plate and a right guide plate disposed adjacent one another and spaced apart to create said gap for receiving a finger.

6. The device as set forth in claim 5 wherein said finger guide unit includes an adjustment device located between said left guide plate and said right guide plate, wherein said adjustment device increases or decreases the width of said gap.

7. The device as set forth in claim 6 wherein said adjustment device comprises:

a threaded screw; and an adjustment wheel coupled to said threaded screw, disposed between said left and right guide plates, wherein rotation of said adjustment wheel causes said threaded screw to move in and out of a threaded aperture formed in one of said left and right guide plates.

8. The device as set forth in claim 6 wherein said adjustment device comprises:

two threaded screws; and an adjustment wheel coupled to each of said threaded screws, disposed between said left and right guide plates, wherein rotation of said adjustment wheel causes each of said threaded screws to move in and out of a threaded aperture formed in each of said left and right guide plates, respectively.

9. The device as set forth in claim 8 wherein said adjustment device further comprises:

an adjustment mount for positioning said adjustment wheel between said left guide plate and said right guide plate.

10. The device as set forth in claim 9 wherein said adjustment mount connects said threaded screws and said pivot shaft.

11. The device as set forth in claim 9 wherein said adjustment mount is comprised of:

two adjustment knob halves.

12. The device as set forth in claim 5 wherein said left guide plate and said right guide plate each include a finger contact edge which can be removed and replaced.

13. The device as set forth in claim 12 wherein said contact edge includes a low friction material.

14. The device as set forth in claim 12 wherein said material is at least one of polytetrafluoroethylene and daflon.

15. The device as set forth in claim 5 further comprising:

an alignment rod disposed between said left and right guide plates to stabilize and align said left and right guide plates above said platen.

16. The device as set forth in claim 5 wherein said left guide plate and said right guide plate further comprise:

an extension disposed on an edge of each of said left and right guide plates, opposite said gap, for rotating said finger guide unit above said platen.

17. The device set forth in claim 1, wherein said finger guide unit further comprises at least one removeable finger contact edge disposed at said gap.

18. The device as set forth in claim 17 wherein each removeable finger contact edge is made of polytetrafluoroethylene.

19. A device for electronically capturing a fingerprint image comprising:

an optical platen having a scanning area;

a detector device for receiving an image of a fingerprint reflected from said platen; and a finger guide unit having edges at a gap in the finger guide unit, wherein said optical platen moves relative to said finger guide unit in response to rotation of a finger in said gap.

20. The device as set forth in claim 19, wherein each edge is made of a low-friction material.

* * * * *

UNITED STATES PATENT AND TRADEMARK OFFICE
CERTIFICATE OF CORRECTION

PATENT NO. : 6,687,391 B1
DATED : February 3, 2004
INVENTOR(S) : Scott et al.

It is certified that error appears in the above-identified patent and that said Letters Patent is hereby corrected as shown below:

Title page, Item [54], and Column 1, lines 1-3,
Item [54] Title, please replace the title with -- FINGER GUIDE UNIT FOR A FINGERPRINT SCANNER WITH MOVEABLE PLATEN --.

Signed and Sealed this

Twenty-seventh Day of July, 2004

JON W. DUDAS
*Acting Director of the United States Patent and Trademark Office*